United States Patent [19]

Sogawa

[11] Patent Number: 4,893,501

[45] Date of Patent: Jan. 16, 1990

[54] THROTTLE VALVE OPENING DEGREE DETECTING SYSTEM FOR CONTROLLING AN INTERNAL COMBUSTION ENGINE

[75] Inventor: Yoshiyuki Sogawa, Tokyo, Japan

[73] Assignee: Fuji Jukogyo Kabushiki Kaisha, Tokyo, Japan

[21] Appl. No.: 271,691

[22] Filed: Nov. 16, 1988

[30] Foreign Application Priority Data

Nov. 24, 1987 [JP] Japan ................................ 62-296996

[51] Int. Cl.⁴ ............................................ G01M 15/00

[52] U.S. Cl. .................................... 73/118.1; 123/494

[58] Field of Search ............... 73/118.1, 116; 123/494; 338/48, 67, 120, 121, 201

[56] References Cited

U.S. PATENT DOCUMENTS 4,693,111 9/1987 Arnold et al. .................. 338/120 X

*Primary Examiner*—Jerry W. Myracle

*Attorney, Agent, or Firm*—Beveridge, DeGrandi & Weilacher

[57] ABSTRACT

A throttle valve opening degree detecting system for controlling an internal combustion engine which generates a signal corresponding to a throttle valve opening by using a throttle sensor whose resistance changes with the throttle valve opening. The throttle sensor has a plurality of resistors connected in parallel therewith and a plurality of switches coupled to the resistors. The switches are turned on and off in response to control signals from a controller so that the output voltage characteristic of the throttle sensor changes. The controller generates the control signals in accordance with the engine speed. Thus, the output voltage characteristic of the throttle sensor has a good resolution even at the range of low engine speed and small throttle valve opening.

2 Claims, 2 Drawing Sheets

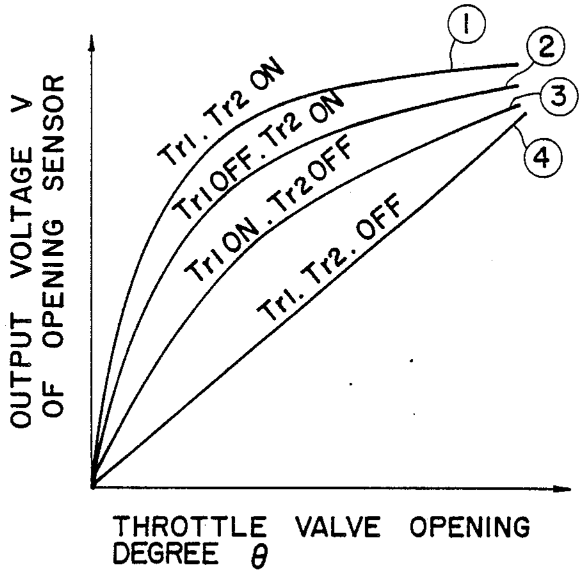
FIG. 3
ENGINE SPEED N
| THROTTLE VALVE OPENING DEGREE θ \ (rpm) | 0–1500 | 1500–2500 | 2500–3500 | 3500– |
|---|---|---|---|---|
| 0–10 | ① | ② | ③ | ④ |
| 10–20 | ② | ③ | ④ | ④ |
| 20–30 | ③ | ④ | ④ | ④ |
| 30– | ④ | ④ | ④ | ④ |
FIG. 4
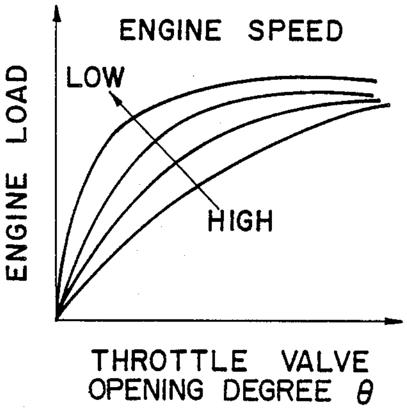
FIG. 5

THROTTLE VALVE OPENING DEGREE DETECTING SYSTEM FOR CONTROLLING AN INTERNAL COMBUSTION ENGINE

BACKGROUND OF THE INVENTION

1. Field of the Invention

The present invention relates to a throttle valve opening degree detecting system for controlling an internal combustion engine in accordance with the engine speed and degree of throttle valve opening.

2. Description of Related Art

The degree of throttle valve opening which is an essential parameter to control the engine, and can be obtained with a throttle sensor. Various types of throttle sensors have been proposed heretofore. However, none of conventional throttle sensors have a sufficient resolution for a range of small degrees of throttle valve opening.

In particular, in engine control systems, the degree of throttle valve opening becomes an important source of information for detecting the operation load of an engine. A throttle sensor for detecting the degree of opening is generally constructed of a rheostat, such as disclosed in Japanese Utility Model Laid-open Publication Nos. 57-92107 and 59-66106. An output voltage proportional to the degree of throttle valve opening can be obtained from the sensor. This output voltage undergoes analog/digital conversion by a control unit and is supplied to a computer.

However, there are problems associated with conventional throttle sensors. Namely, the degree of throttle valve opening is not proportional to the engine load (e.g., pressure within the intake pipe) so that the engine load is non-linear relative to the degree of throttle valve opening as shown in FIG. 5. More specifically, for low engine speeds, the engine load sharply changes for small degrees of throttle valve opening, and less for large degrees of throttle valve opening. As a result, it becomes necessary to detect the degree of throttle valve opening with a high resolution for low engine speeds and small degrees of throttle valve opening, in order to precisely control the engine. However, the above-mentioned conventional throttle sensor cannot obtain a sufficient resolution engine control for low engine speeds and small degrees of throttle valve opening.

SUMMARY OF THE INVENTION

The present invention has been made in consideration of the above problems, and it is an object of the invention to provide a throttle valve opening detecting system in which the output voltage characteristic of a throttle sensor is changed in accordance with the engine speed and the degree of throttle valve opening, to substantially obtain a sufficient resolution for engine control over the entire operation range thereof.

To achieve the above object of this invention, the throttle valve opening degree detecting system for controlling an internal combustion engine in accordance with the engine speed and degree of throttle opening, comprises: a throttle sensor for detecting a throttle valve opening degree and for providing an output voltage characteristic; a plurality of switch means; a plurality of resistors each coupled to a corresponding one of said plurality of switch means, said plurality of resistors being adapted to be connected in parallel with said throttle sensor; and control means for supplying a control signal to turn on and off said plurality of switch means; whereby said plurality of switch means are selectively turned on and off in response to said control signal from said control means to variably set the output voltage characteristic of said throttle sensor.

With the throttle valve opening degree detecting system constructed as above, the output voltage characteristic of the throttle sensor can be set to have a sharper change for small degrees of throttle valve opening, with the opening becoming small at the range of low engine speed, and the engine speed becoming lower for small degrees of throttle valve opening. Therefore, a sufficiently high resolution in detecting a degree of throttle valve opening can be obtained even at the small degrees of throttle valve opening and low engine speeds.

BRIEF DESCRIPTION OF THE DRAWINGS

FIG. 3 is a graph showing the output voltage of the throttle sensor relative to the degree of throttle valve opening;

FIG. 4 is a selection map for selecting a characteristic of the throttle sensor, wherein the characteristic is selected in accordance with the throttle valve opening degree and the engine speed; and FIG. 5 is a graph showing the engine load relative to the degree of throttle valve opening.

DETAILED DESCRIPTION OF THE PREFERRED EMBODIMENT

Figure 1:
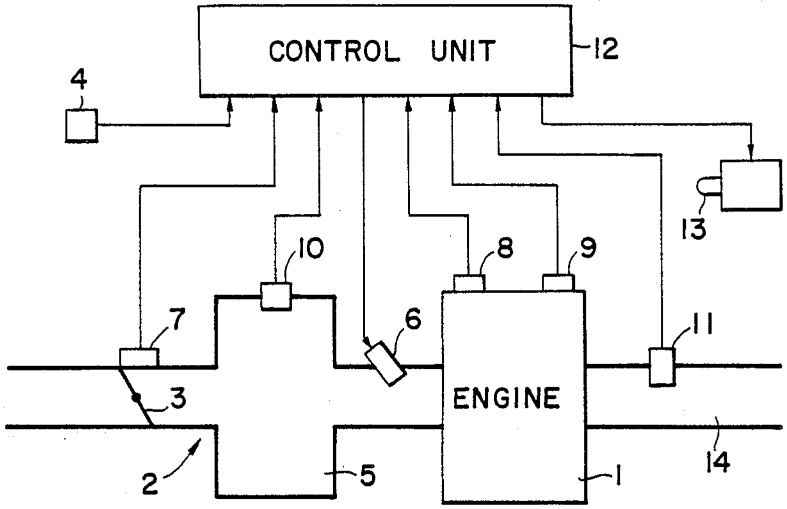
FIG. 1 is a schematic diagram showing the outline of an embodiment of the throttle valve opening degree detecting system of this invention.

Referring to FIG. 1, at the air intake system 2 of an engine 1, there are mounted a throttle valve 3 and a collector chamber 5 downstream of the valve 3. Injectors 6 are mounted near air intake ports of the engine 1 at the air intake manifolds downstream of the collector chamber 5. In addition, there are mounted a throttle sensor 7 at the throttle valve 3, a water temperature sensor 8 and crank angle sensor 9 at the engine 1, an intake air temperature sensor 10 at the collector chamber 5, and an air/fuel ratio sensor 11 at an exhaust gas system 14 of the engine 1. The detected signals from the sensors 7, 8, 9, 10 and 11 and from an atmospheric pressure sensor 4 are supplied to a control unit 12 serving as control means. The control unit 12 calculates the detected signals and outputs proper control signals to the injectors 6 and ignition coils 13.

Figure 2:
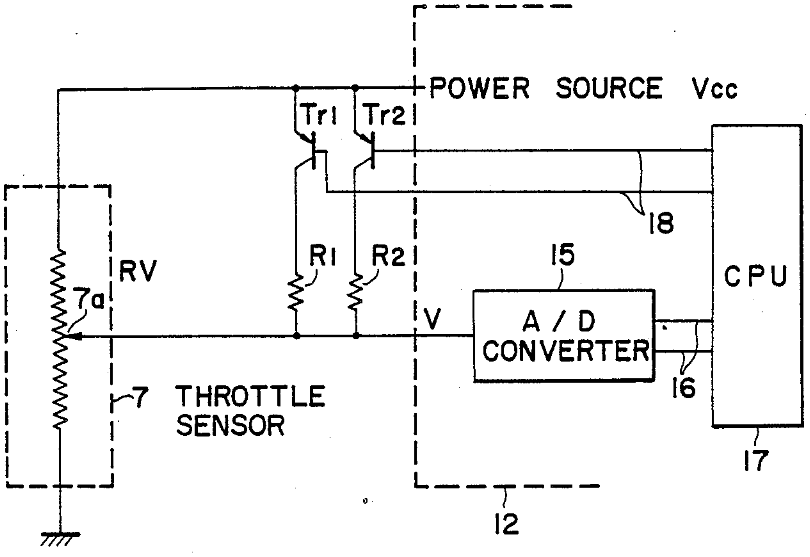
FIG. 2 is a circuit diagram showing the main part of the control unit constituting the gist of this invention.

The circuit arrangement of the control unit or control means 12 and the throttle sensor 7 is shown in FIG. 2. In particular, the throttle sensor 7 is constructed of a rheostat Rv to which a plurality of resistors R1 and R2 having different values are connected in parallel. Switch means such as transistors Tr1 and Tr2 are coupled to the resistors R1 and R2, respectively. One end of the resistor Rv is connected to a power source Vcc, the other is grounded, and the movable contact 7*a* thereof is connected via an A/D converter 15 to input ports 16 of a CPU (Central Processing Unit) 17. The bases of transistors Tr1 and Tr2 are connected to output ports 18 of CPU 17 of the control unit 12. The control unit 12 selectively supplies control signals S1 (1, 1 in binary notation), S2 (0, 1), S3 (1, 0) and S4 (0, 0) to transistors Tr1 and Tr2.

With the above construction, it is possible to change the output voltage characteristic of the throttle sensor 7, as shown in FIG. 3, in accordance with the on/off state of transistors Tr1 and Tr2 driven by the control signals from the control unit 12.

The operation of changing the output voltage characteristic of the throttle sensor 7 will now be described. The output voltage characteristic is changed in accordance with the degree of throttle valve opening and the engine speed. The combination of the degree of throttle valve opening and engine speed determine the output voltage characteristics (1) to (4) shown in FIG. 4, of which the numbers correspond to those characteristic curves indicated in FIG. 3. For instance, the characteristic (1) with ON transistors Tr1 and Tr2 shown in FIG. 3 is selected for throttle valve opening of 10 degrees or less and engine speeds of 1500 r.p.m or less. As the degree of throttle valve opening and engine speed become great, the characteristics are changed to the characteristic (2) with OFF transistor Tr1 and ON transistor Tr2, to the characteristic (3) with ON transistor Tr1 and OFF transistor Tr2, and to the characteristic (4) with OFF transistors Tr1 and Tr2.

Consequently, transistors Tr1 and Tr2 are turned on for low engine speeds and small degree of throttle valve opening so that the output voltage change of the throttle sensor 7 becomes sharp at small degrees of throttle valve opening, thereby realizing a high resolution. As above, switch means or transistors Tr1 and Tr2 are selectively turned on and off in accordance with the information regarding the engine speed and degree of throttle valve opening supplied to the control unit, to thus selectively connect resistors R1 and R2 in parallel to resistor Rv. Accordingly, a proper output voltage characteristic of the throttle sensor 7 can be selected to allow a high resolution at any operating condition of the engine.

The output voltage characteristic of the throttle sensor may be changed to depend on only the degree of throttle valve opening or engine speed. In the above embodiment, transistors Tr1 and Tr2 are maintained turned on while the throttle valve is completely closed.

As appreciated from the above detailed description of the present invention, the output voltage characteristic of the throttle sensor is changed in accordance with the engine speed and degree of throttle valve opening. Therefore, even if a throttle sensor itself has a linear output voltage characteristic, a sufficiently high resolution can be obtained over the entire operation range of engine control, and the engine control system as a whole attains a high precision.

What is claimed is:

1. A throttle valve opening degree detecting system for controlling an internal combustion engine comprising:
   - a throttle sensor for detecting a throttle valve opening degree;
   - a plurality of switch means;
   - a plurality of resistors each coupled to a corresponding one of said plurality of switch means, said plurality of resistors being adapted to be connected in parallel with said throttle sensor; and
   - control means for supplying a control signal to turn on and off said plurality of switch means;
   - whereby said plurality of switch means are selectively turned on and off in response to said control signal from said control means to variably set the output voltage characteristic of said throttle sensor;
   - said control means changes the on/off state of said control signal in accordance with the engine speed.

2. A throttle valve opening degree detecting system for controlling an internal combustion engine comprising:
   - a throttle sensor for detecting a throttle valve opening degree;
   - a plurality of switch means;
   - a plurality of resistors each coupled to a corresponding one of said plurality of switch means, said plurality of resistors being adapted to be connected in parallel with said throttle sensor; and
   - control means for supplying a control signal to turn on and off said plurality of switch means;
   - whereby said plurality of switch means are selectively turned on and off in response to said control signal from said control means to variably set the output voltage characteristic of said throttle sensor;
   - said control means changes the on/off state of said control signal in accordance with a combination of throttle valve opening and engine speed.

* * * * *